United States Patent

Martinson et al.

[11] Patent Number: 5,122,720
[45] Date of Patent: Jun. 16, 1992

[54] AUTOMATED FADER SYSTEM

[75] Inventors: Joseph Martinson, Alhambra; Dale Manquen, Thousand Oaks, both of Calif.

[73] Assignee: Martinsound Technologies, Inc., Alhambra, Calif.

[21] Appl. No.: 479,983

[22] Filed: Feb. 14, 1990

Related U.S. Application Data

[63] Continuation-in-part of Ser. No. 444,273, Dec. 1, 1989.

[51] Int. Cl.⁵ .................................................. G05B 1/06
[52] U.S. Cl. .................................. 318/663; 318/624; 360/13; 360/79; 381/109
[58] Field of Search .................. 318/663, 624; 360/13, 360/79; 381/109

[56] References Cited

U.S. PATENT DOCUMENTS

| | | | |
|---|---|---|---|
| 2,694,749 | 11/1954 | Hardy . | |
| 2,899,505 | 8/1959 | Dresser . | |
| 3,020,343 | 2/1962 | Aldridge, Jr. . | |
| 3,260,951 | 7/1966 | Kaye . | |
| 3,397,286 | 8/1968 | Prewitt et al. . | |
| 3,702,901 | 11/1972 | Cherry | 179/1 |
| 3,809,812 | 5/1974 | Smith, Sr. | 179/1 |
| 3,932,886 | 1/1976 | Olms et al. | 360/13 |
| 3,952,154 | 4/1976 | Gates, Jr. | 179/1 |
| 3,956,591 | 5/1976 | Gates, Jr. | 179/1 |
| 3,990,020 | 11/1976 | Porter, III | 330/207 |
| 4,076,959 | 2/1978 | Gilbert | 179/1 |
| 4,109,214 | 8/1978 | Main | 330/254 |
| 4,113,984 | 9/1978 | Gilbert et al. | 179/1 |
| 4,164,625 | 8/1979 | Igeta | 179/1 |
| 4,204,204 | 5/1980 | Pitstick | 340/771 |
| 4,242,676 | 12/1980 | Piquet et al. | 340/711 |
| 4,274,074 | 6/1981 | Sakamoto | 338/160 |
| 4,306,114 | 12/1981 | Callahan | 179/1 |
| 4,363,934 | 12/1982 | Scholz | 179/1 |
| 4,404,527 | 9/1983 | Schertz et al. | 330/84 |
| 4,434,325 | 2/1984 | Kobayashi et al. | 381/104 |
| 4,435,833 | 3/1984 | Thakkar | 381/109 |
| 4,462,112 | 7/1984 | Watanabe | 381/109 |
| 4,528,686 | 7/1985 | Dressler | 381/28 |
| 4,556,835 | 12/1985 | Vogel et al. | 318/663 |
| 4,616,271 | 10/1986 | Yasukawa et al. | 360/32 |
| 4,631,525 | 12/1986 | Serravalle, Jr. | 340/365 |
| 4,682,364 | 7/1987 | Dunnebackee | 381/109 |

Primary Examiner—William M. Shoop, Jr.
Assistant Examiner—Saul M. Bergmann
Attorney, Agent, or Firm—Poms, Smith, Lande & Rose

[57] ABSTRACT

A moving fader system, primarily for the processing and combining of audio signals, includes a dedicated preprocessor to implement the execution of repetious input instructions. Other features contributing to the operation of the system include (1) "Look-up Tables" included in the preprocessor for conversion purposes, (2) a fiberoptic link for transmission of digital signals between the preprocessor and the servo circuits associated with each fader assembly, and (3) circuitry for combining the outputs of a positiion digital-to-analog (D/A) converter, an offset correction D/A converter and a gain correction D/A converter, to provide accurate analog servo signals to each fader assembly.

23 Claims, 4 Drawing Sheets

AUTOMATED FADER SYSTEM

RELATED APPLICATION DATA

The present application is a continuation-in-part of commonly owned, copending application, Ser. No. 07/444,273, filed Dec. 1, 1989.

BACKGROUND OF THE INVENTION

A common task of audio signal processing is the combining of a multitude of audio sources into a lesser number of channels as dictated by the format of the target final product. To assist the recording engineer with this task, two types of computer based automation systems have been developed which can memorize and recreate any and all of the operator's prior manipulation of the controls.

All systems encode and store position changes of the input devices. Some systems, referred to as "moving fader" systems, can replicate the original motions of the input devices by means of motor driven servo mechanisms with the input device. The replicated movements of the input devices also serve as displays of the current values of the stored information. The majority of these systems also include the audio control element within the servoed input devices. It is also noted that the input control devices of these systems normally utilize a large number of "faders" or fader potentiometers, which are linearly movable to control audio levels and which have both an audio control potentiometer and a servo control potentiometer, both of which are changed in value as the fader slider is shifted in position.

In contrast, the non-motorized automation systems must provide additional devices to display the current values of stored information and to control the audio signal level. The control element in non-servo systems must be independent from the input device so that control changes can occur during replay without any attendant motion of the input device.

Although automation systems have been commercially available, the marketplace demands continued improvements and responsiveness, ease of use and flexibility. A key factor in providing these improvements is the amount of processor time required to quickly respond to system tasks. A common solution is to use multiple general purpose processors to share the workload. A disadvantage and limitation of this approach is that the numerous repetitious instruction fetch cycles required to continuously scan the input/output devices and the communications required between the multiple processors cause a substantial overhead burden which degrade system speed.

SUMMARY OF THE INVENTION

According to the present invention, these disadvantages and limitations of the prior art are overcome by utilizing a dedicated hardware preprocessor to immediately execute repetitious instructions without any need for memory access for instructions. The hardware also provides autonomous monitoring, conversion and correction of the data feeding to and from the console controls to minimize central processor workload. The asynchronous communications between the preprocessor and the central processor are fully buffered by dual port and first in/first out (FIFO) memory to eliminate communications overhead.

Other features of the present invention include a novel servo control system for moving the fader potentiometers, and a novel fader drive mechanism.

These and other objects, advantages and features of the present invention will become readily apparent to those skilled in the art from a study of the following description of an exemplary preferred embodiment when read in conjunction with the attached drawings and appended claims.

DESCRIPTION OF AN EXEMPLARY PREFERRED EMBODIMENT

Referring now to FIGS. 1–4A and 4B, there is shown a novel pulley assembly 10 adapted for the automated linear movement of a fader potentiometer 12. The assembly 10 includes a first pulley 14, a second pulley 16, a capstan 18 and a string 20.

Figure 1:
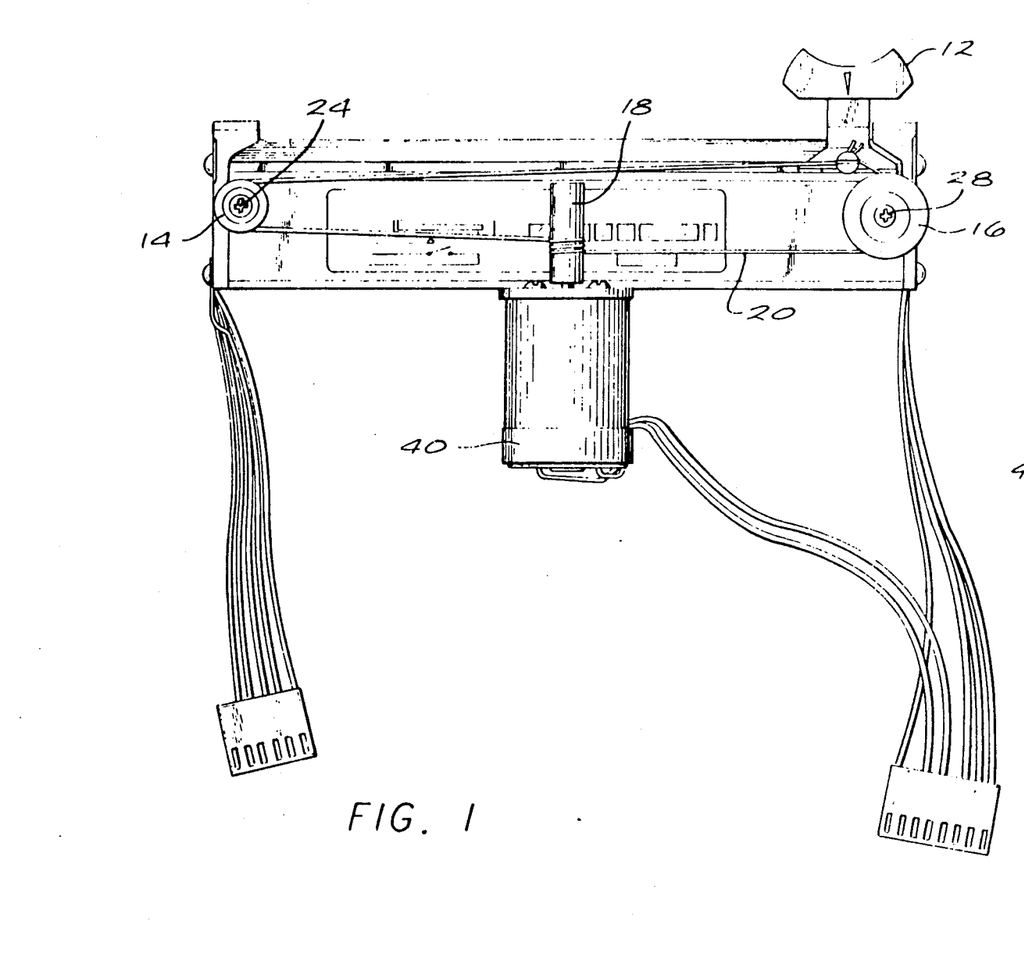
FIG. 1 is an elevational view of the motorized fader assembly constructed according to the principles of the present invention.
Figure 4A:
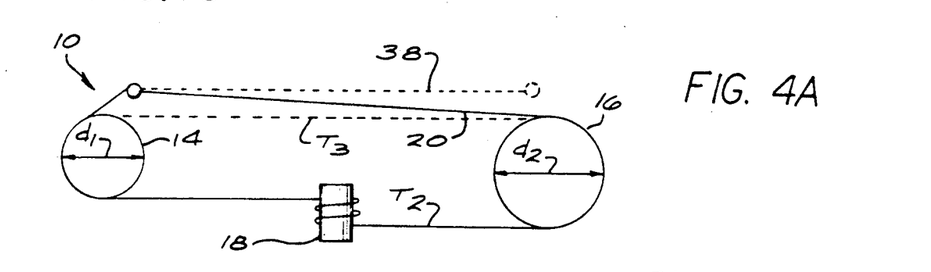
FIG. 4A schematically illustrates the mechanical configuration of the motorized fader assembly of FIG. 1.

The first pulley 14 has a first diameter $d_1$ and a circumferential edge 22. The first pulley is rotatable about a first axis 24. The second pulley 16 has a second diameter $d_2$ and a circumferential edge 26. The second pulley 16 is rotatable about a second axis 28. The capstan 18 is disposed generally intermediate the first pulley 14 and the second pulley 16. The capstan 18 is rotatable about a third axis 30 which is substantially normal to the first axis 24 and the second axis 28. The string 20 is attachable to the fader potentiometer 12, such as by a threaded fastener 32. The string 20 is further engagingly wound about the capstan 18 and the circumferential edge 22 of the first pulley 14 and the circumferential edge 26 of the second pulley 16. The first diameter $d_1$ and the second diameter $d_2$ are selected so that the string 20 lies substantially along a first tangent $T_1$ from the first pulley 14 and a second tangent $T_2$ from the second pulley 16, with the tangents $T_1$ and $T_2$ being displaced from one another substantially farther apart than the working range of the string on the capstan. More specifically, the displacement of the tangents should be greater than the diameter of the string times the sum of (1) the number of wraps of the string, and (2) the total number of rotational turns of the capstan as the fader potentiometer number is shifted from end to end. The spacing of the tangents $T_1$ and $T_2$ prevent scuffing of the string 20 at the capstan 18 which would otherwise occur by the adjacent turns of the string rubbing against one another. The first tangent $T_1$ and the second tangent $T_2$ lie in a plane containing the first pulley 14 and second pulley 16.

Figure 2:
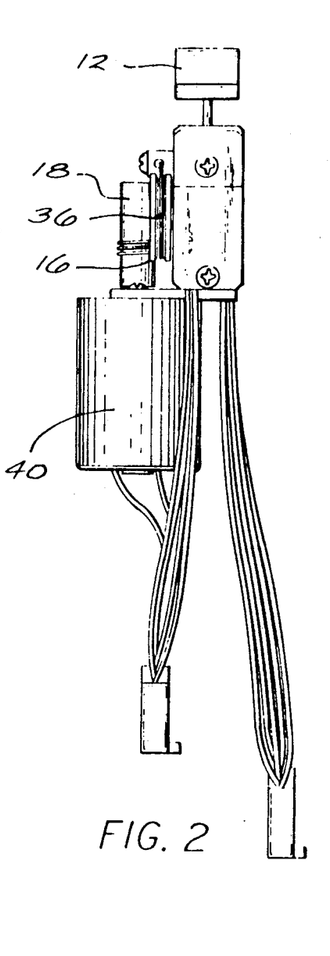
FIG. 2 is a side view of the motorized fader assembly of FIG. 1.
Figure 3:
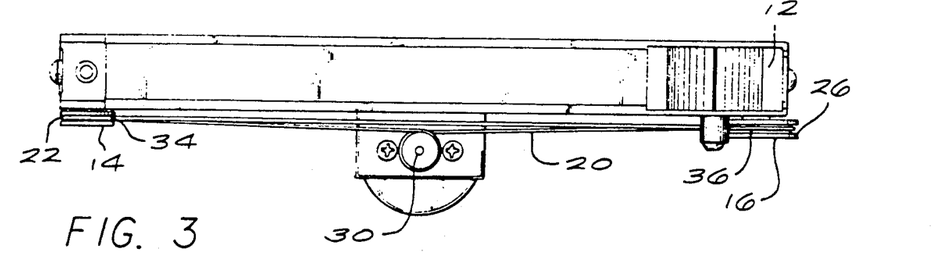
FIG. 3 is a plan view of the motorized fader assembly of FIG. 1.

As best seen in FIGS. 2 and 3, the circumferential edge 22 of the first pulley 14 and the circumferential edge 26 of the second pulley 16 each has a V-cut groove 34, 36 in which the string 20 is received. The capstan 18 has a generally cylindrical outer surface 38, thus being a straight faced capstan. The string 20, in a preferred embodiment of the present invention, is of cofilament construction and includes a glass fiber core and a polymer sheath. The cofilament construction provides for sufficient elasticity, obviating the need for spring tensioning of the string 20. The glass core of the string 20 prevents creep, which is inherent in prior art monofilament strings. Such creep causes a loss of tension. Tensioning of the string 20 is accomplished by pulling the string 20 taut through the fastener 32 and tightening the fastener.

To provide the proper tensioning of the string, as best seen in FIGS. 1 and 4A, the string moves the fader potentiometer 12 along a line 38 which is parallel to and spaced from a common tangent $T_3$ of the first pulley 14 and the second pulley 16. This offset from the tangent $T_3$ generates additional string tension at the ends of the stroke of the fader potentiometer 12. Thus, in the midrange of the stroke, there is low tension on the string 20 to reduce friction. However, at the ends of the stroke, the high tension avoids slippage of the string 20 on the capstan 18, thereby avoiding frictional heating between the string 20 and capstan 18 wherein such friction could burn through the string 20. As described in greater detail hereinbelow, a motor 40 is used to drive the capstan 18; and the high friction at the ends of the travel of the fader potentiometer prevents rotation of the motor and capstain beyond the end of the fader travel limit which could otherwise burn through the string.

Figure 4B:
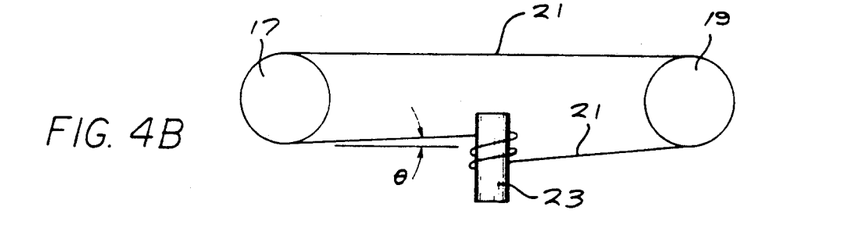
FIG. 4B shows the mechanical configuration of prior art fader arrangements for comparison with FIG. 4A.

FIG. 4B shows diagramatically a prior art fader configuration with equal diameter pulleys 17 and 19 with the string 21 extending around capstan 23. With the angle of the string 21 between the pulley 17 and the capstain being such as to force the turns of string 20 into the adjacent turns, the string will become frayed. Further, in some cases, the frayed strands of one turn of the string will become locked under adjacent turns of the string, thereby preventing smooth operation of the fader assembly.

In summary, the foregoing mechanical arrangements have the following advantages or features:

a. The use of different diameter pulleys achieves spontaneous spacing between string wraps on the capstan to avoid overlap and the scuffing of adjacent wraps.

b. The offset between the upper common tangent of the pulleys and the string attachment to the fader potentiometer increases the string tension and therefore the friction on the capstan at the extremes of string travel.

c. The use of cofilament string provides a stable tensioning means without additional springs or other compliance elements.

d. The use of cofilament string eliminates fraying and the resulting problems with frayed strings being trapped under adjacent wraps of string.

Figure 5A:
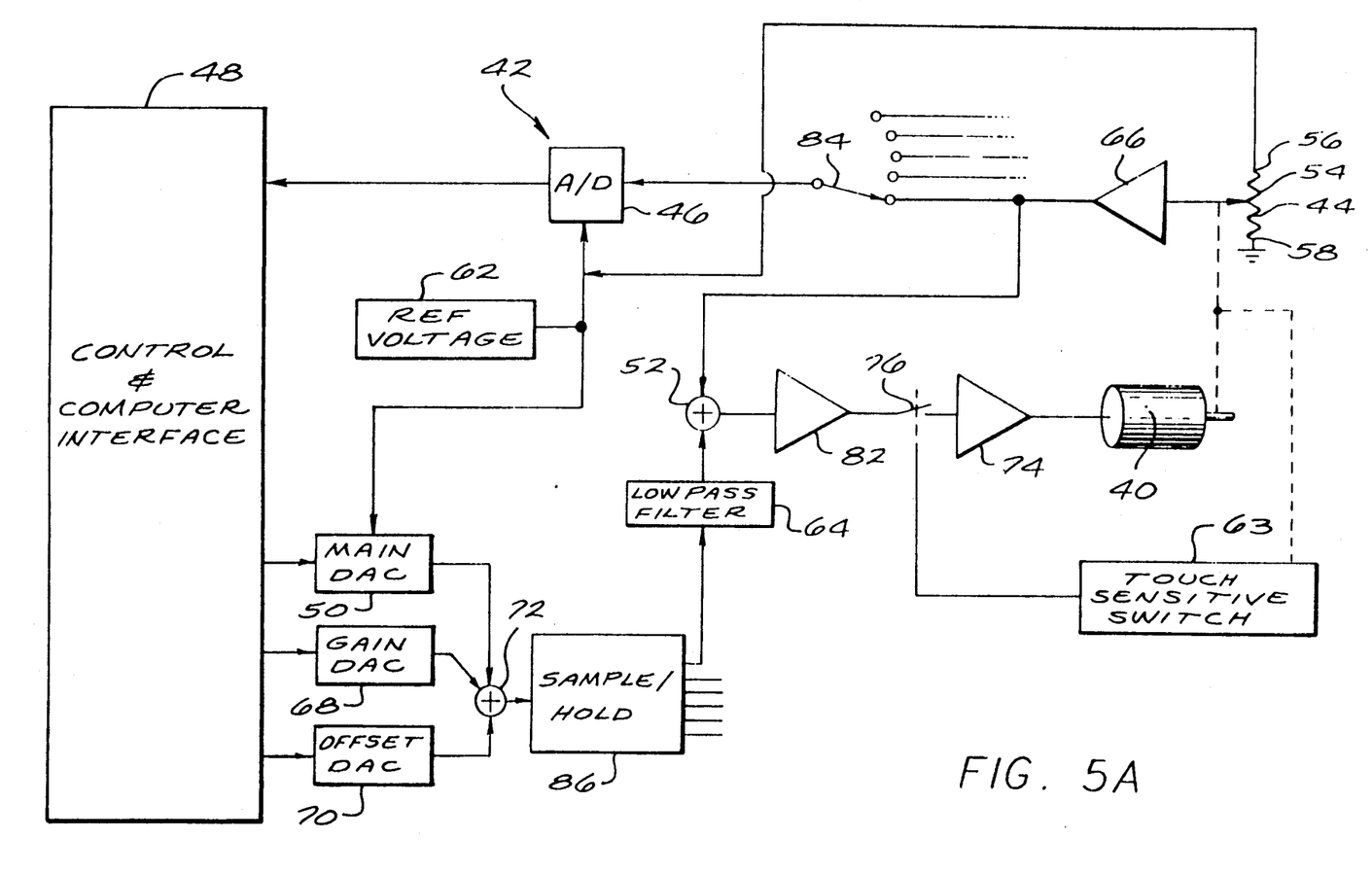
FIG. 5A is a functional block diagram of the servo control system constructed according to the principles of the present invention.

Referring now to FIG. 5A, there is shown a servo control system 42 for detecting the present position of the fader potentiometer 12 and to move the fader potentiometer to a selected position. The servo control system 42, as seen in FIG. 5A, illustrates for purposes of clarity only one channel of the servo control system 42 operable on one fader potentiometer 12.

The servo control system 42 includes a position sensor 44, an analog-to-digital converter 46, a controller 48, a digital-to-analog converter 50, a summing circuit 52, and the motor 40 described hereinabove with reference to FIGS. 1-4.

The position sensor 44 in one embodiment of the present invention, is a potentiometer 54 having a first terminal 56, a second terminal 58 and a wiper terminal 60. The wiper terminal 60 is adapted to be mechanically connected to the fader slider 12 so that movement of the fader potentiometer 12 moves the wiper terminal 60. The first terminal 56 is electrically coupled to a source 62 of reference potential, and the second terminal 58 is coupled to ground potential. The position sensor 44 develops a first analog signal at the wiper terminal 60. The first analog signal is indicative of the present position of the fader potentiometer 12.

The analog-to-digital converter 46 converts the first analog signal to a first digital signal. The first digital signal is then applied to the controller 48. As discussed in greater detail hereinbelow, the analog to digital converter 46 develops position information to be used by the controller 48 for remembering moves. This information is used only when an operator is touching and manually moving the fader potentiometer 12. If the operator is not touching the fader potentiometer 12, the controller 48 develops a second digital signal indicating a target position to which the fader 12 must move. The fader potentiometer 12 may include a touch sensitive switch 63.

The digital-to-analog converter 50 converts the second digital signal to a second analog signal. The second analog signal is then applied to the summing circuit 52 to develop an electrical signal which is the difference between the first analog signal developed by the position sensor 44 and the second analog signal. The motor 40, which is coupled to the fader potentiometer 12 by the pulley assembly 10 then moves the fader 12 with a torque proportional to the error between the target and present positions. When the target position is reached, the error generated torque will diminish, parking the fader potentiometer 12 at the target position.

So that the fader potentiometer 12 moves smoothly but the system response remains high, the servo control system 42 further includes a low pass filter 64 electrically coupled between the digital-to-analog converter 50 and the summing circuit 52. The low pass filter 64 is, in a preferred embodiment of the present invention, a second order low pass filter having minimal overshoot, such as a Bessel filter. It should be noted that any filter having these characteristics may be used.

A buffer amplifier 66 may be electrically connected between the position sensor 44 and the analog-to-digital converter 46. Accordingly, the first analog signal will be developed at the output of the buffer amplifier 66 to drive the analog to digital converter 46. The output of the buffer amplifier 66 also drives the summing circuit 52.

To correct for gain and offset errors in the servo control system 42, the system is initialized by moving each fader potentiometer through its full travel under software control. The controller 48 compares the target position address developed by the digital to analog converter 50 to the final parking address developed by the analog to digital converter 46. The differences between the desired and actual position at the extremes of the stroke of the fader potentiometer 12 are used by the controller 48 to calculate appropriate gain and offset correction factors for each channel. The controller 48 then stores these calculated gain and offset correction factors for each fader potentiometer 12. Accordingly, the servo control system 42 further includes a gain error digital-to-analog converter 68 and an offset error digital-to-analog converter 70. The gain converter 68 converts the gain error digital signal to a gain error analog signal. Similarly, the offset error converter converts the offset error digital signal to an offset error analog signal. A second summing circuit 72 sums the gain error analog signal and the offset error analog signal with the second analog signal prior to application to the first summing circuit 52, the signal being coupled through the addressable sample/hold circuit 86 and the low pass filter 64.

Figure 5B:
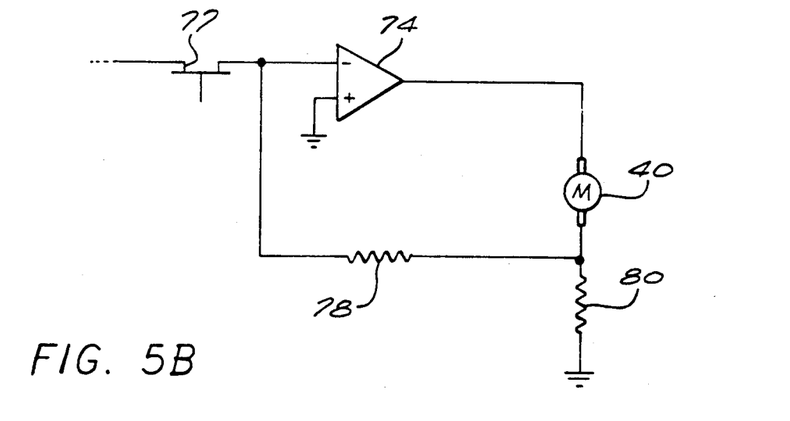
FIG. 5B illustrates in greater detail a portion of FIG. 5A.

With further reference to FIG. 5B, an electrical signal from the first summing circuit 52 is applied to the motor 40 through a transconductance motor drive current amplifier 74 and a switch 76 serially coupled between the first summing circuit 52 and the current amplifier 74. One terminal of the motor 40 is coupled to the output of the transconductance amplifier 74. The other terminal of the motor 40 is connected through a current sense resistor 80 to ground. A feedback resistor 78 to the inverting input of the amplifier 74 is coupled between the common node of the motor and the current sense resistor 80. The switch 76 is open during manual movement of the fader switch 12 which forces the transconductance amplifier 74 to maintain zero current in the motor 40. The transconductance amplifier 74 will then develop a voltage equal in amplitude and polarity to the induced EMF voltage developed by the motor during such manual movement to eliminate dynamic braking and to provide freewheeling of the motor. In the prior art, a voltage source amplifier is utilized and the switch is usually connected in series with the high current motor loop. Placing a switch in the high current loop necessitates a switch with high current and voltage capabilities and a low "on" resistance. The switch 76 of the present invention, being at the input of the amplifier 74, need only be a low power device. In a preferred embodiment of the present invention, the switch 76 is an FET switch which is controlled by the touch sensitive switch 63. A compensation amplifier 82 may be electrically coupled between the first summing circuit 52 and the switch 76.

Completing the description of FIG. 5A, intermediate the buffer amplifier 66 and the analog-to-digital converter 46 is an input scanner 84 which sequentially scans each channel of the servo control system. Each fader assembly is associated with a different channel input to scanner 84. Similarly, a sample and hold circuit 86 having an input coupled to the second summing circuit 72. The input scanner 84 and the sample and hold circuit 86 provide for switching between each of the channels. Thus, the circuitry connected to the output of the sample and hold circuit 86 is replicated for each channel. Similarly, the circuitry coupled to the input of the input scanner 84 is also replicated for each channel.

Figure 6:
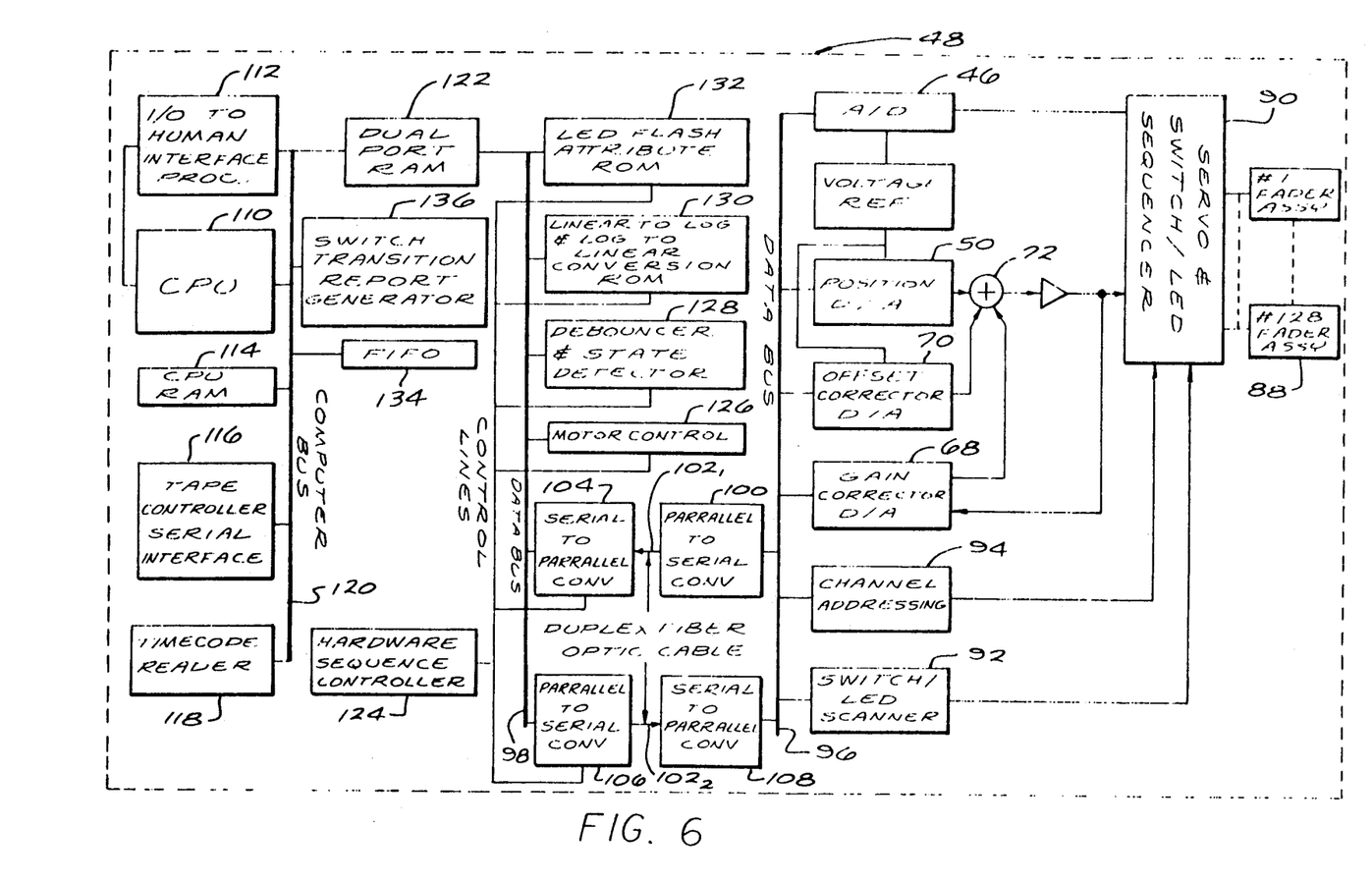
FIG. 6 is a more detailed schematic block diagram of the servo control system of FIG. 5 illustrating the intelligent interface in greater detail.

Referring now to FIG. 6, there is shown a schematic block diagram of the controller 48. It is to be understood that each fader assembly 88 or channel includes a fader potentiometer, the sensor 44, motor 40, and the pulley assembly 10. The servo sequencer 90, switch scanner 92, and channel addressing 94 provide the remaining functions for each of the channels described hereinabove with reference to FIG. 5a. Each fader assembly 88 also includes the touch sensitive switch 63 mentioned above, and LED signal lights indicating the current mode of operation of each fader assembly.

The controller 48 includes a data bus 96 providing communications between the analog-to-digital converter 46, the digital-to-analog converter 50, the offset digital analog converter 70, the gain error digital-to-analog converter 74, the switch scanner 92, and channel addressing 94. The controller 48 further includes a second data bus 98. For communication from data bus 96 to data bus 98, data is passed through a parallel to serial converter 100 and transmitted over one-half of a duplex fiberoptic cable $102_1$ to a serial to parallel converter 104. For communications from data bus 98 to data bus 96, the data is passed through a parallel to serial converter 106 over a second half $102_2$ of the duplex fiberoptic cable 102 through a serial to parallel converter 108. The constant data exchange rate between the controller 48 and the numerous fader assemblies 88 is approximately five megabits per second in each direction and is therefore well suited to the serial communications link through the duplex fiberoptic cable 102. The controller 48 can thus be removed from the main console housing and placed within the chassis which contains the CPU 110 in human interface processor 112. Software for the CPU 110 is contained in the CPU RAM 114. A tape controller 116 and a time code reader 118 are further provided. Connecting each of the immediately described above components is a computer bus 120. Interconnecting the data bus 98 and the computer bus 120 is a dual port RAM 122. A hardware sequence controller 124 executes repetitious instructions without any need for memory access for instructions. The other hardware such as motor control 126, debouncer and state detector 128, conversion ROM 130 and LED flash attribute ROM 132 provides autonomous monitoring, conversion and correction of the data feeding to and from the console controls to minimize the workload on the central processing unit 110. The asynchronous communications between the preprocessor 124 and the central processor 110 are buffered by the dual port RAM 122 and the FIFO memory 134. The asynchronous communications eliminate communications overhead.

Only changes in current status, however, require the attention of the central processor 110. To avoid burdening the central processing unit 110 with routine tasks, the current embodiment utilizes interface hardware which continuously scans and preprocesses all of the switch, LED and fader data. By scanning approximately ten times faster than the central processor needs data, the interface can apply debounce algorithms and generate finer resolution LED drive wave forms. The continuous and frequent scans also provide fresh memory with short latency.

To avoid the need for repetitious output from the processor, a dual port memory 122 is used as the communication link between the central processor 110 and the interface or preprocessor, which includes the circuitry in FIG. 6 between buses 96 and 120. Once a request for action is placed into the dual port memory, the interface or preprocessor can execute the operations indefinitely. For example, a request to flash a specific LED at a rate, dim level and duty cycle requires only one instruction sent from the processor. The interface will continue to generate the complex on/off pattern required to flash the LED indefinitely. Since the two sides of the dual port memory 122 are independent and asynchronous, neither the processor nor the interface wastes time waiting for synchronization.

With the interface preprocessing all the inputs from the fader modules 128, the computer can operate in an "events-driven" mode, responding only to changes which have been validated by the interface. If no changes take place, the computer remains in an idling mode waiting for input. Meanwhile, the interface continues to scan at full speed.

To further enhance the processing speed of the interface, an offset interlace pattern of addressing the data input is utilized. For example, the analog-to-digital conversion process requires several microseconds of multiplexing and settling time and several more microseconds for the sampling and conversion of the waveform values. By the time that data is ready, the scanner has already begun processing information for the next fader potentiometer in the sequence. The addressing must backtrack momentarily to the previous channel to load the data into the correct location of the dual port memory. Since the scanner timing and addressing are designed to accommodate such latencies, the interface can operate at full speed without pausing for responses.

Several ROM lookup tables are included in the interface so that parameters utilized in the computer software can be instantly converted to hardware parameters. These functions include the translation of LED flash attributes to voltage waveforms and the conversion between dB values of fader position used in software to the binary data format used by the analog-to-digital and digital-to-analog systems.

In considering the functions of the circuitry included in the interface or preprocessor between buses 96 and 120 of FIG. 6 in somewhat greater detail, the Read Only Memory or ROM 130 includes a "Look-Up Table" for converting from the decibel or dB sound levels which are input at 112, to the corresponding digital values required to position each of the fader controls 88. Thus, the sound or decibel levels may range from −102.4 dB to plus 5 dB or 10 dB; and the corresponding numerical positions for the fader potentiometers may range from 0 to 4,095. As mentioned above, each fader assembly includes two potentiometers, one for servo control purposes, controlled numerically and digitally, and the other providing variable audio output levels. The look-up table ROM 130 provides quick and easy conversion between the logarithmic dB levels useful at the input/output 112, and the digital positioning signals needed to locate the position of the fader potentiometer.

Similarly, each fader assembly 88 is provided with several signal lamps indicating the mode of operation of the system pursuant to commands from input/output circuit 112 and CPU 110. The standard LED illumination sequences and intensities are stored in "Look-Up Tables" in ROM 132. The circuit 128, designated "Debouncer and State Detector" reviews the state of switching circuits, such as switch 76 (see FIG. 5a), and checks the state during several successive cycles to verify that the state has changed, and then stores the new state. The Motor Control circuit 126 controls motor energization duration. Thus, it normally only requires in the order of 100 milliseconds to reposition a fader control slider; and so the motor control circuit 126 energizes the motor for a predetermined interval such as one-half second, so that the servo motors are not energized unnecessarily.

Concerning the duplex fiberoptic cable 102, this cable may be fifty or more feet long, and serves to isolate the audio signals, which may be at very low levels, from possible interference by the flood of digital (pulse) data being transmitted back and forth between the preprocessor and the circuitry to the right of bus 96 in FIG. 6.

In summary, the functions of the intelligent interface are (1) to provide an asynchronous bidirectional link between the processor and fader peripherals; (2) scan all switch inputs, testing each with a hysteresis algorithm to eliminate contact bounce, to determine if the state of the switch has changed. If a valid change is detected, the transition location and state are logged into a state table which stores the states of all of the devices; (3) scan requested region of dual port memory for changes in state, loading of FIFO with a queue of all valid transitions so that the control computer can easily check which devices require software servicing; (4) scan and illuminate the numerous indicator lamps with any of several duty cycle and flash rate patterns; (5) read all of the input device positions, translating from raw binary position data to actual logarithmic attenuation values; (6) move the input devices to desired positions, translating from logarithmic attenuation values to raw binary position data, applying appropriate correction for gain and offset errors, and activating the motor drive amplifier for a period of programmed duration; and (7) convert parallel format input and output data from lights, switches and faders into serial format suitable for transmission over a duplex fiberoptic link, transmit and receive the serial data over the fiberoptic links and then reconvert from serial to parallel format at the destination.

There has been described hereinabove a novel automated fader system described with reference to a particular preferred embodiment thereof. Those skilled in the art may now make numerous uses of and departures from the present invention without departing from the inventive concepts disclosed herein. More specifically, in the present specification, emphasis has been on the improvements of the present system, as contrasted to known fader systems of somewhat more primitive types. As mentioned above, each fader assembly normally includes two potentiometers, one for servo control purposes and one for audio signal level control or "fading" purposes, which are mechanically linked together. It is to be understood that, instead of audio signal level control, the system could control the illumination levels of lights for a dramatic performance, or other similar functions. Accordingly, the present invention is to be defined solely by the scope of the following claims.

We claim:

1. A servo control system for detecting a present position of a device and for moving said device to a selected position, said servo control system comprising:

a position sensor to develop a first analog signal indicative of said present position of said device;

an analog-to-digital converter to convert said first analog signal to a first digital signal;

a controller to which said digital signal is applied and to develop a second digital signal indicative of said selected position;

a digital-to-analog converter to convert said digital signal to a second analog signal;

a summing circuit to develop an electrical signal which is a difference between said first analog signal and said second analog signal;

a motor operatively coupled to said device, said electrical signal being coupled to said motor;

a transconductance motor drive current amplifier electrically coupled to said motor; and a switch serially coupled between said summing circuit and said current amplifier, said switch being open during manual movement of said device, said current amplifier developing a voltage of equal amplitude and polarity to any induced EMF voltage developed by said motor during such manual movement to eliminate dynamic braking.

2. A system as set forth in claim 1 further comprising:

a low pass filter electrically coupled between said digital-to-analog converter and said summing circuit.

3. A system as set forth in claim 2 wherein said filter is a second order low pass filter having minimal overshoot.

4. A system as set forth in claim 1 further comprising:

a buffer amplifier electrically connected between said position sensor and said analog-to-digital converter.

5. A servo control system as set forth in claim 1 wherein said position sensor includes a potentiometer having a first terminal, a second terminal, and a wiper terminal, said wiper terminal being adapted to become mechanically connected to said device so that movement of said device moves said wiper terminal, said first terminal being adapted to coupling to a reference potential, said second terminal being adapted for coupling to ground potential, said first analog signal being developed at said wiper terminal.

6. A servo control system as set forth in claim 5 wherein said reference potential is further coupled to said analog-to-digital converter and said digital-to-analog converter to cancel errors due to reference potential drift.

7. A system as set forth in claim 1 further comprising:

a servo loop gain correction digital-to-analog converter, said controller developing a predetermined servo loop gain error correction digital signal, said gain converter converting said gain error digital signal to a servo loop gain correction error analog signal; and a second summing circuit to sum said gain error analog signal with said second analog signal prior to being applied to said first summing circuit.

8. A system as set forth in claim 7 wherein said controller outputs said gain error digital signal at a rate of at least 30 kilohertz.

9. A system as set forth in claim 1 further comprising:

a servo loop offset correction error digital-to-analog converter, said controller developing a predetermined servo loop offset error correction digital signal, said offset error converter converting said offset error digital signal to a servo loop offset correction error analog signal; and a second summing circuit which sums said offset error analog signal with said second analog signal prior to application to said first summing circuit.

10. A system as set forth in claim 9 wherein said controller outputs said offset error digital signal at a rate of at least 30 kilohertz.

11. A servo control circuit as defined in claim 2 wherein a sample and hold circuit is included in said system between said digital-to-analog converter and said low pass filter.

12. A servo control system for detecting a present position of a plurality of devices and for moving each individual one of said devices to a selected position, said servo control system comprising:

a plurality of position sensors, each of said sensors being associated with a respective one of said devices, each of said sensors developing a first analog signal indicative of said present position of said respective one of said devices;

an analog to digital converter;

a scanner for sequentially coupling said first analog signal of each of said sensors to said analog-to-digital converter, said analog-to-digital converter converting each said first analog signal to a multiplex first digital signal wherein said multiplex first digital signal has a plurality of channels, each of said channels corresponding to one of said sensors;

a controller to which said multiplex first digital signal is applied to develop a multiplex second digital signal indicative of said selected position for each of said devices, said multiplex second digital signal having a plurality of channels, each of which corresponds to a respective one of said channels of said multiplex first digital signal;

a digital-to-analog converter to convert said multiplex second digital signal to a multiplex analog signal having a plurality of channels, each of which corresponds to a respective one of said channels of said multiplex first digital signal;

a sample and hold circuit having an input to which said second analog signal is applied and a plurality of outputs, said sample and hold circuit sampling each of said channels of said second analog signal and developing a pluraltiy of third analog signals, each of said third analog signals corresponding to one of said outputs, each of said third analog signals also corresponding to each of said channels of said second analog signal;

a plurality of summing circuits, each of said summing circuits being electrically coupled to a respective one of said outputs to develop an electrical signal which is the difference between said first analog signal and a corresponding one of said third analog signals for each of said channels associated with each one of said devices; and a plurality of motors, each of said motors being operatively coupled to a respective one of said devices, said electrical signal from each of said summing circuits being applied to a respective one of said motors.

13. A system as set forth in claim 12 further comprising:

a plurality of low pass filters, each of said low pass filters being electrically coupled between a respective one of said outputs of said sample and hold circuit and a respective one of said summing circuits.

14. A system as set forth in claim 13 wherein each of said filters is a second order low pass filter.

15. A system as set forth in claim 12 further comprising:

a plurality of buffer amplifiers, each of said buffer amplifiers being electrically connected between a respective one of said position sensors and said scanner.

16. A servo control system as set forth in claim 12 wherein each of said position sensors includes a potentiometer having a first terminal, a second terminal, and a wiper terminal, said wiper terminal being adapted to being mechanically connected to said wiper terminal so that movement of one of said devices associated therewith moves said wiper terminal, said first terminal being adapted for coupling to a reference potential, said second terminal being adapted for coupling to a ground potential, said first analog signal being developed as said wiper terminal.

17. A servo control system as set forth in claim 16 wherein said reference potential is further coupled to said analog-to-digital converter and said digital-to-analog converter to cancel errors due to reference potential drift.

18. A system as set forth in claim 12 further comprising:
a gain digital-to-analog converter, said contoller developing a predetermined multiplex gain error digital signal having a plurality of channels, each of said channels corresponding to one said channels of said first digital signal, said gain converter converting said gain error digital signal to a multiplex gain error analog signal having a plurality of channels each of which corresponds to one of said channels of said gain error digital signal; and
a second summing circuit to sum said gain error analog signal with said second analog signal prior to application to said sample and hold circuit.

19. A system as set forth in claim 18 wherein said controller outputs said gain error digital signal at a rate of at least 30 kilohertz.

20. A system as set forth in claim 12 further comprising:
an offset error digital-to-analog converter, said controller developing a predetermined mulitplex offset error digital signal having a plurality of channels each of which conrresponds to one of said channels of said first digital signal, said offset error converter converting said offset error digital signal to a multiplex offset error analog signal having a plurality of channels, each of which corresponds to one of said channels of said offset error digital signals; and
a second summing circuit to sum said offset error analog signal with said second analog signal prior to application to said sample and hold circuit.

21. A system as set forth in claim 20 wherein said controller outputs said offset error digital signal at a rate of at least 30 kilohertz.

22. A system as set forth in claim 12 further comprising:
a plurality of motor drive current amplifiers, each of said current amplifiers being electrically connected to a respective one of said motors; and
a plurality of switches, each of said switches being serially coupled between a respective one of said first summing circuit and a respective one of said current amplifiers, each of said switches being open during manual movement of one of said devices associated therewith, said current amplifiers developing a voltage of equal amplitude and polarity to an induced EMF voltage developed by one of said motors associated therewith during such manual movement to eliminate dynamic braking.

23. A servo control system as defined in claim 12 wherein said controller includes a main CPU, a preprocesor and a dual port RAM, said CPU being coupled to a first port of said RAM and said preprocessor being coupled to a second port of said RAM, said preprocessor repeatedly developing said second digital signal from data stored by said CPU in said RAM, said CPU updating said data in said RAM asynchronously with respect to said preprocessor.

* * * * *